United States Patent Office 3,116,162
Patented Dec. 31, 1963

3,116,162
TEXTILE TREATMENT
John Earnshaw and Gwilym Thomas Jones, Manchester, England, assignors to Imperial Chemical Industries Limited, London, England, a corporation of Great Britain
No Drawing. Filed Jan. 16, 1961, Ser. No. 82,740
Claims priority, application Great Britain Jan. 28, 1960
7 Claims. (Cl. 117—138.8)

This invention relates to a process for treating textiles to reduce their tendency to accumulate charges of static electricity.

According to the present invention we provide a process for treating textiles which comprises applying thereto the product, hereinafter referred to as the reaction product, obtained by reacting a N-(carboxyalkyl)-, N-(aminocarbonylalkyl)-, N-(cyanoalkyl)- or N-carbalkoxyalkyl substituted aliphatic polyamine with a halide of an ethylene oxide condensate as hereinafter defined, the reaction product being modified on the textile material by interaction with a salt containing bromide or iodide ions or with a bromide or iodide of an ethylene oxide condensate which may be the same as or different from the halide of the ethylene oxide condensate.

The halides of the ethylene oxide condensates and used in the invention contain two or more halogen atoms and are obtained by replacing the hydroxyl groups of ethylene oxide condensates with halogen atoms. Ethylene oxide condensates suitable for conversion to the halides are for example the polyoxyethylene glycols, ethylene oxide condensates of polyhydric alcohols such as glycerol, pentaerythritol or sorbitol, ethylene oxide condensates of amines such as ethylamine, dodecylamine, cetylamine and ethylene oxide condensates of amides. The replacement of the hydroxyl groups of the ethylene oxide condensates by halogen atoms may be effected by reaction with for example thionyl chloride or thionyl bromide, either alone, or in an inert solvent such as toluene, or in the presence of an acid acceptor such as pyridine. The iodides are most easily prepared from the corresponding chlorides by reaction with the equivalent amount of sodium iodide in acetone. The halides of the ethylene oxide condensates (also referred to as polyethenoxy halides) are, in general, readily soluble or dispersible in water. The average molecular weight of the condensates from which the halides are prepared should be within the range 200 to 1500.

The preferred N-(carboxyalkyl)-, N-(aminocarbonylalkyl)-N-carbalkoxyalkyl or N-(cyanoalkyl)-substituted aliphatic polyamines may be prepared, e.g. by reacting an aliphatic polyamine with an aliphatic ethenoid mono- or dicarboxylic acid, or the amide, ester or nitrile derived therefrom. The aliphatic polyamines used in this invention contain at least two primary or secondary amino groups per molecule. Suitable aliphatic polyamines include ethylene diamine, diethylene triamine, triethylene tetramine, tetraethylene pentamine and bis hexamethylene triamine.

The above aliphatic ethenoid mono- or dicarboxylic acid has the general formula

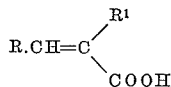

where R=H or COOH; R¹=H, CH₃—, C₂H₅— or CH₂.COOH. Alternatively, the corresponding amides, nitriles or esters may be used. Suitable acids include acrylic acid, methacrylic acid, itaconic acid, fumaric acid and maleic acid. Examples of corresponding amides, nitriles and esters which may be used include acrylamide, methacrylamide, acrylonitrile and methyl methacrylate.

The reaction of an aliphatic polyamine with an aliphatic ethenoid mono- or dicarboxylic acid, or the amide, ester or nitrile derived therefrom involves an addition reaction of the amine group to the double bond. Thus the reaction between diethylene triamine and acrylic acid may be represented by the formula

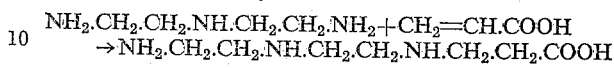

The preparation of N-carbalkoxyalkyl substituted aliphatic amines and polyamines by the interaction of aliphatic amines or polyamines with esters of acrylic or methacrylic acids is described at page 156 of Monomeric Acrylic Esters, by Riddle, published by the Reinhold Publishing Company in 1954.

The preparation of N-(aminocarbonylalkyl) substituted amines by reacting amines with acrylamide may be represented by the formula

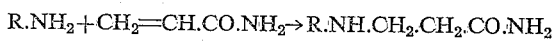

This reaction is described in Chemistry of Acrylamide, 2nd edition, a technical bulletin published by American Cyanamid Co. and copyrighted in 1959. A similar reaction between acrylamide and ammonia is described in United States Patent 2,663,733.

The preparation of N-(cyanoalkyl) substituted amines by the reaction of amines with acrylonitrile may be represented by the formula

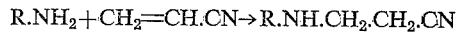

This reaction is described in The Chemistry of Acrylonitrile, 2nd edition, published by the American Cyanamid Co., New York in 1959.

The reaction between the unsaturated acid and the polyamine may be carried out with or without a solvent. Suitable solvents for the reaction include water, methanol, ethanol, iso-propanol, butanol, β-ethoxyethanol, ethylene glycol or any inert solvent. In general the reaction proceeds at room temperature without any catalyst, but if desired higher or lower temperatures may be employed. The proportion of acid or derivative to polyamine may be varied from a minimum of one molecule of acid or derivative per molecule of polyamine up to a maximum of one molecule of acid or derivative for each primary and secondary amino group in the polyamine.

N-(carboxyalkyl)-, N-(aminocarbonylalkyl)-, N-cyanoalkyl)- and N-carbalkoxyalkyl substituted aliphatic polyamines suitable for use in the invention may also be prepared in other ways, for example by reacting the polyamine with such compounds as monochloroacetic acid, chloroacetamide or chloroacetonitrile. Reaction of a polyamine with these halogen substituted compounds can be regarded as simple alkylation. This is described in Schmidt's Organic Chemistry at page 167 which deals with the formation of amines and shows the reaction of halogen substituted compounds with amino groups. The hydrogen atom borne by an amino group of the polyamine reacts with the halogen and is replaced by the group formerly attached to the halogen. The reaction between the polyamines and the halogen substituted compounds involves reaction of an =NH or —NH₂ group with the halogen group. For example, the reaction with monochloroacetic acid proceeds as follows:

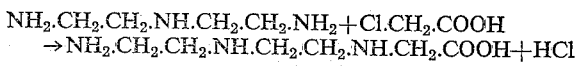

Reaction of a polyamine with monochloroacetic acid produces N-(carboxyalkyl) substitution; with chloroacetamide, N-(aminocarbonylalkyl) substitution; and with chloroacetonitrile, N-(cyanonitrile) substitution in the polyamine. Other substituted polyamines may be prepared by reacting the polyamine with formaldehyde and hydrocyanic acid.

The substituted polyamines are reacted with the halide, and preferably the chloride, derived from an ethylene oxide condensate preferably in a solvent and at an elevated temperature. Suitable solvents include water, methanol, ethanol, isopropanol, n-butanol, β-ethoxyethanol and ethylene glycol and the temperature employed may range from room temperature up to the boiling point of the solvent used. Reaction is facilitated if the carboxyl groups of the substituted polyamine are neutralised with a mild alkali such as an alkali metal carbonate prior to commencing reaction with the chloride. In some cases it may be advantageous to have additional alkali present during the reaction to act as an acid binding agent. The reaction products are water-soluble but may also be soluble in polar organic solvents such as alcohols. The ratio of the number of moles of total polyethenoxy halide, whether completely included within the reaction product or whether only a portion of the halide is initially included therein and a second portion later added thereto, to the number of moles of substituted polyamine should lie within the range 1:5 to 5:1. The reaction product is preferably applied to the textile material from an aqueous solution which treatment bath may also contain dissolved or dispersed therein the salt containing bromide or iodide ions or the second portion of polyethenoxy bromide or iodide. Alternatively, the bromide or iodide whether in the form of a salt or a polyethenoxy compound may be applied to the textile material separately from the reaction product. When a second portion of polyethenoxy bromide or iodide is to be added to the treatment bath the ratio of the number of moles of polyethenoxy halide initially included in the reaction product to the number of moles of polyamine/carboxylic acid condensate should not exceed 2:1. The added polyethenoxy bromide or iodide used in the treatment bath can be but is not necessarily derived from the same ethylene oxide condensate as the halide in the reaction product. The ratio of the number of moles of added polyethenoxy bromide or iodide to the number of moles of substituted polyamine in the reaction product should lie within the range 1:3 to 3:1; alternatively, the equivalent quantity of alkali metal bromide, iodide or other salt may be used.

Suitable salts containing bromide or iodide ions are the alkali metal bromides or iodides, but any other simple salt containing bromide or iodide ions may be used.

After impregnation of the textile material with an aqueous solution or dispersion of the reactants the textile material is dried and baked at a temperature preferably within the range 130–210° C. The treatment thus given confers on the textile material a marked antistatic effect which is highly resistant to washing and dry-cleaning processes.

Although any sort of textile material may be treated according to the process of the invention it is especially valuable for treating hydrophobic fibres such as those composed of polyacrylonitrile, polyamides, polyethylene terephthalate and the like. The amounts of the treating agents applied are usually such that the textile materials increase in weight by from about 0.1% to 5.0% as a result of the treatment.

The invention is illustrated but not limited by the following examples in which parts and percentages are by weight.

EXAMPLE 1

Diethylene triamine (15.8 parts, 0.15 mole) was dissolved in water (25 parts). Acrylic acid (14.5 parts, 0.2 mole) was added in small portions, and the mixture was stirred overnight at room temperature. Soda ash (11 parts) was added and when this had dissolved the solution was filtered and evaporated to dryness under reduced pressure. The residue was dissolved in a mixture of butanol (40 parts) and water (20 parts). The dichloride of a polyoxyethylene glycol having an average molecular weight of about 600 (49.2 parts, 0.075 mole calculated on chlorine content) was added and the mixture stirred for 3 hours at 120–130° C. Solvent was distilled off on the waterpump keeping the bath temperature below 70° C. and the residue was dissolved in sufficient water to give a 30% solution.

4.5% of the above solution, together with 1.5% of the diiodide of a polyoxyethylene glycol having an average molecular weight of about 600 (both quantities based on the dry weight of the fibre) were applied to nylon and a polyethylene terephthalate ("Terylene" polyester) fibre filament fabric, from aqueous solution by padding. The polyoxyethylene glycol diiodide was used in the form of an aqueous emulsion, prepared by mixing together the required quantity of diiodide with 0.1% of its weight of a nonionic dispersing agent and adding the mixture to cold water with stirring. The pH of the pad liquor was adjusted to pH 10–11 with sodium hydroxide solution before application to the textile materials. After padding the fabrics were dried at 60–70° C. and then cured by heating for 6 minutes at 150° C. Portions of treated and untreated material were given 1 and 5 washes in the Atlas launder-o-meter in a solution containing 0.3% soap and 0.2% soda ash at 80° C. for 30 minutes, at a liquor to goods ratio of 50:1, five steel balls being added to each pot. After washing each pattern was rinsed three times in water at 80–90° C., dried at 60–70° C. and after conditioning for 24 hours at 65% relative humidity and 70° C., tested for static effects by the method described by Hayek and Chromey (Am. Dyes. Reptr., 40, 164, 1951). The results of these tests are given in Table I below.

*Table I*

| Fabric | Nylon | | | | | |
|---|---|---|---|---|---|---|
| | Initial | | 1 wash | | 5 washes | |
| | [1] μA. | [2] ½T. | μA. | ½T. | μA. | ½T. |
| Untreated | 1,000 | >180 | 740 | 31 | 1,680 | >180 |
| Treated | 6 | 0–1 | 10 | 0–1 | 48 | 1 |

| Fabric | "Terylene" | | | | | |
|---|---|---|---|---|---|---|
| | Initial | | 1 wash | | 5 washes | |
| | [1] μA. | [2] ½T. | μA. | ½T. | μA. | ½T. |
| Untreated | 1,200 | >180 | 1,860 | >180 | 1,860 | >180 |
| Treated | 18 | 0–1 | 10 | 0–1 | 58 | 0–1 |

[1] μA.=charge arbitrarily expressed in micro-amperes after 2 minutes rubbing.
[2] ½T.=time in seconds for charge to decay to half its value after rubbing.

EXAMPLE 2

Bis-hexamethylene triamine (10.8 parts, 0.05 mole) was dissolved in water (40 parts). Acrylic acid (7.2 parts, 0.1 mole) was added, and after stirring so as to bring all into solution the mixture was left to stand for 48 hours at room temperature. Soda ash (5.3 parts, 0.05 mole) was added and when this had dissolved the dichloride of a polyoxyethylene glycol having an average molecular weight of about 600 (23.8 parts, 0.0375 mole) was added. The mixture was heated at 100–110° C. for 12 hours, more water being added as required to keep all in solution. The product was charcoaled and filtered. The solution had a solid content of 20%.

6% of the above solution together with 1.5% of the polyoxyethylene glycol diiodide employed in Example 1 were applied to nylon and "Terylene" polyester fibre filament fabric, and tested as also described in that example. The results of the tests are given in Table II.

Table II

| Fabric | Nylon | | | | "Terylene" | | | |
|---|---|---|---|---|---|---|---|---|
| | 1 wash | | 5 washes | | 1 wash | | 5 washes | |
| | $\mu$A. | ½T. | $\mu$A. | ½T. | $\mu$A. | ½T. | $\mu$A. | ½T. |
| Untreated | 320 | 15 | 360 | 18 | 480 | >180 | 420 | 87 |
| Treated | 6 | 0-1 | 6 | 0-1 | 6 | 0-1 | 6 | 0-1 | where $\mu$A. and ½T. have the same significance as in Example 1.

EXAMPLE 3

Bis-hexamethylene triamine (10.8 parts, 0.05 mole) was dissolved in water (40 parts). Acrylic acid (10.8 parts, 0.15 mole) was added and after stirring so as to ensure thorough mixing the mixture was left to stand for 48 hours at room temperature. Soda ash (8.0 parts, 0.075 mole) was added and when this had dissolved polyethylene glycol 600 dichloride (23.8 parts, 0.0375 mole) was added. The mixture was treated at 100–110° C. for 12 hours, more water being added as required to keep all in solution. The product was charcoaled and filtered. The solution had a solid content of 21%.

The above solution was applied together with the polyoxyethylene glycol diiodide employed in the previous example at the concentrations described in Example 2 to nylon and "Terylene" polyester fibre fabrics. The tests were performed as described in Example 1. The results are given in Table III.

Table III

| Fabric | Nylon | | | | "Terylene" | | | |
|---|---|---|---|---|---|---|---|---|
| | 1 wash | | 5 washes | | 1 wash | | 5 washes | |
| | $\mu$A. | ½T. | $\mu$A. | ½T. | $\mu$A. | ½T. | $\mu$A. | ½T. |
| Untreated | 330 | 15 | 360 | 18 | 480 | >180 | 420 | 87 |
| Treated | 6 | 0-1 | 30 | 0-1 | 6 | 0-1 | 6 | 0-1 | where $\mu$A. and ½T. have the same significance as in Example 1.

EXAMPLE 4

Diethylene triamine (10.3 parts, 0.1 mole) was dissolved in water (10 parts). A solution of methacrylic acid (15.2 parts of 85% acid, 0.15 mole) in water (10 parts) was added dropwise with stirring and the mixture was then stirred at room temperature for 18 hours. Soda ash (8.0 parts, 0.075 mole) was added and when this had dissolved a solution of the polyoxyethylene glycol dichloride as used in the previous examples (31.6 parts, 0.05 mole) in butanol (40 parts) was added. The mixture was stirred at 100–110° C. for 6 hours and solvent was then distilled off on the water pump keeping the bath temperature below 70° C. The residue, 63 parts, was dissolved in 63 parts of water.

3.0% of the above solution together with 1.5% of the polyoxyethylene glycol diiodide as used in the previous examples were applied and tested on "Terylene" polyester fibre filament fabric as described in Example 1. The results are given in Table IV.

Table IV

| Fabric | "Terylene" | | | |
|---|---|---|---|---|
| | 1 wash | | 5 washes | |
| | $\mu$A. | ½T. | $\mu$A. | ½T. |
| Untreated | 480 | >180 | 420 | 87 |
| Treated | 6 | 0-1 | 12 | 0-1 | where $\mu$A. and ½T. have the same significance as in Example 1.

EXAMPLE 5

Diethylene triamine (2.6 parts, 0.025 mole) was dissolved in $\beta$-ethoxyethanol (9.3 parts). Acrylic acid (3.6 parts, 0.05 mole) was added in small portions and the mixture was stirred overnight at room temperature. Soda ash (8.0 parts, 0.075 mole), the polyoxyethylene glycol dichloride of Example 1 (31.8 parts, 0.05 mole) and $\beta$-ethoxyethanol (27.9 parts) were added and the mixture stirred for six hours at 110° C. The whole was then brought into solution by the addition of water (35 parts) and solvent was distilled off on the water pump keeping the bath temperature below 70° C. The residue was dissolved in sufficient water to give a 27% solution. The product was charcoaled and filtered.

EXAMPLE 6

Bis hexamethylene triamine (5.4 parts, 0.025 mole) was dissolved in $\beta$-ethoxyethanol (18.6 parts). Acrylic acid (3.6 parts, 0.05 mole) was added in small portions and the mixture was stirred overnight at room temperature. Soda ash (6.0 parts), the polyoxyethylene glycol dichloride of Example 1 (19.9 parts, 0.031 mole) and $\beta$-ethoxyethanol (27.9 parts) were added and the mixture stirred for six hours at 110° C. The whole was then brought into solution by the addition of water (40 parts) and solvent was distilled off on the water-pump keeping the bath temperature below 70° C. The residue was dissolved in sufficient water to give a 23% solution. The product was charcoaled and filtered.

EXAMPLE 7

A length of "Terylene" polyester continuous filament fibre fabric was impregnated with an aqueous solution containing 12% of the product of Example 5 and 2% of sodium iodide. The fabric increased in weight by 50% as a result of the impregnation. It was dried at 60–70° C. and then baked for 6 minutes at 150° C. A further length was treated similarly with the product of Example 6. Treated and untreated material was then washed and tested as described in Example 1. The treated material showed good antistatic properties with excellent durability to washing, as illustrated in the following table:

| Treatment | Antistatic Performance | | | |
|---|---|---|---|---|
| | 1 wash | | 5 washes | |
| | $\mu$A. | ½T. | $\mu$A. | ½T. |
| Untreated | 440 | >180 | 450 | >180 |
| Treated with product of Example 5 | 20 | 0-1 | 20 | 1 |
| Treated with product of Example 6 | No change | | 15 | 0-1 | where $\mu$A. and ½T. have the same significance as in Example 1.

EXAMPLE 8

Lengths of nylon continuous filament fibre fabric were treated with the products of Examples 5 and 6 as described in Example 7. Treated and untreated material was then washed and tested as described in Example 1. The treated material showed good antistatic properties with excellent durability to washing, as illustrated in the following table:

| Treatment | Antistatic Performance | | | |
|---|---|---|---|---|
| | 1 wash | | 5 washes | |
| | $\mu$A. | ½T. | $\mu$A. | ½T. |
| Untreated | 455 | >180 | 330 | 116 |
| Treated with product of Example 5 | 20 | 0-1 | 20 | 0-1 |
| Treated with product of Example 6 | No change | | 92 | 2 | where μA. and ½T. have the same significance as in Example 1.

EXAMPLE 9

Bis hexamethylene triamine (10.8 parts) was dissolved in water (20 parts). Methacrylic acid (15.2 parts of 85% acid) was added in small portions and the mixture was stirred overnight at room temperature. Soda ash (7.9 parts) and water (20 parts) were added and the mixture was stirred until all had dissolved. The polyoxyethylene glycol dichloride of Example 1 (23.8 parts) and n-butanol (32 parts) were then added and the mixture was stirred at its boiling point for 6 hours. Solvent was then distilled off on the water-pump keeping the bath temperature below 70° C. The residue was dissolved in sufficient water to give a 33% solution. The product was charcoaled and filered.

EXAMPLE 10

Bis hexamethylene triamine (10.8 parts) was dissolved in water (25 parts). Itaconic acid (19.5 parts) was added in small portions and the mixture was stirred overnight at room temperature. Soda ash (15.9 parts) and water (30 parts) were added and the mixture was stirred until all had dissolved. The polyoxyethylene glycol dichloride of Example 1 (23.8 parts) and n-butanol (48 parts) were then added and the mixture was stirred at its boiling point for 6 hours. Solvent was then distilled off on the water-pump keeping the bath temperature below 70° C. The residue was dissolved in sufficient water to give a 25% solution. The product was charcoaled and filtered.

EXAMPLE 11

Bis hexamethylene triamine (10.8 parts) was dissolved in water (20 parts). Maleic acid (17.4 parts) was added in small portions and the mixture was stirred overnight at room temperature. Soda ash (15.9 parts) and water (20 parts) were added and the whole was stirred until all had dissolved. The polyoxyethylene glycol dichloride of Example 1 (23.8 parts) and n-butanol (32 parts) were then added and the mixture was stirred at its boiling point for 6 hours. Solvent was then distilled off on the water-pump keeping the bath temperature below 70° C. The residue was dissolved in sufficient water to give a 27% solution. The product was charcoaled and filtered.

In the foregoing examples, and in particular Examples 1–6 and 9–11, N-(carboxyalkyl) substituted polyamines are formed. In Example 12, an N-carbalkoxyalkyl substituted polyamine is produced.

EXAMPLE 12

Bis hexamethylene triamine (10.8 parts) and methyl methacrylate (5.0 parts) were dissolved in n-butanol (32 parts) and the solution was stirred overnight at room temperature. The polyoxyethylene glycol dichloride of Example 1 (23.9 parts) was then added and the mixture was stirred at 100–110° C. for 6 hours. Water (15 parts) was added so as to bring all solid matter into solution. Solvent was then distilled off on the water-pump keeping the bath temperature below 70° C. The residue was dissolved in sufficient water to give a 26% solution. The product was charcoaled and filtered.

EXAMPLE 13

A length of "Terylene" polyester continuous filament fibre fabric was impregnated with an aqueous solution containing 9% of the product of Example 9 and 3% of the diiodide of Example 1. The diiodide was used in the form of an aqueous emulsion, prepared by mixing together the required quantity of diiodide with 0.1% of its weight of a nonionic dispersing agent and adding the mixture to cold water with stirring. The pH of the pad liquor was adjusted to pH 10–11 with sodium hydroxide solution before application to the textile material. Other lengths of fabric were impregnated similarly with aqueous solutions containing 12% of the products of Examples 10, 11 or 12 together with 3% of the diiodide of Example 1. After padding the fabrics were dried at 60–70° C. and then baked for 6 minutes at 150° C. Treated and untreated material was then washed and tested as described in Example 1. The treated material showed good antistatic properties with excellent durability to washing, as illustrated in the following table:

| Treatment | Antistatic Performance | | | |
|---|---|---|---|---|
| | 1 wash | | 5 washes | |
| | μA. | ½T. | μA. | ½T. |
| Untreated | 440 | >180 | 450 | >180 |
| Treated with product of Example 9 | 8 | 0–1 | 28 | 3½ |
| Treated with product of Example 10 | 6 | 0–1 | 15 | 0–1 |
| Treated with product of Example 11 | 8 | 0–1 | 25 | 0–1 |
| Treated with product of Example 12 | 8 | 0–1 | 6 | 0–1 | where μA. and ½T. have the same significance as in Example 1.

EXAMPLE 14

Lengths of nylon continuous filament fibre fabric were treated with the products of Examples 9, 10, 11 and 12 as described in Example 13. Treated and untreated material was then washed and tested as described in Example 1. The treated material showed good antistatic properties with excellent durability to washing, as illustrated in the following table:

| Treatment | Antistatic Performance | | | |
|---|---|---|---|---|
| | 1 wash | | 5 washes | |
| | μA. | ½T. | μA. | ½T. |
| Untreated | 430 | 90 | 350 | 37 |
| Treated with product of Example 9 | 50 | 0–1 | 34 | 0–1 |
| Treated with product of Example 10 | 28 | 0–1 | 28 | 0–1 |
| Treated with product of Example 11 | 18 | 0–1 | 8 | 0–1 |
| Treated with product of Example 12 | 16 | 0–1 | 20 | 0–1 | where μA. and ½T. have the same significance as in Example 1.

What we claim is:

1. Process for treating hydrophobic textile materials which comprises applying thereto the product obtained by reacting a member selected from the group consisting of N-(carboxyalkyl)-, N-(aminocarbonylalkyl)-, N-(cyanoalkyl)- and N-carbalkoxyalkyl substituted aliphatic polyamine with a halide of an ethylene oxide condensate, the reaction product being modified on the textile material by interaction with a member selected from the group consisting of simple salts containing bromide ions, bromides of ethylene oxide condensates, simple salts containing iodide ions and iodides of ethylene oxide condensates.

2. Process according to claim 1 wherein the substituted aliphatic polyamine is prepared by reacting an aliphatic polyamine with a member selected from the group consisting of an aliphatic ethenoid mono-carboxylic acid, an aliphatic ethenoid dicarboxylic acid, the amide of one of said acids, the ester of one of said acids and the nitrile of one of said acids.

3. Process according to claim 1 wherein the substituted aliphatic polyamine is prepared by reacting an aliphatic polyamine with a member selected from the group consisting of monochloroacetic acid, chloroacetamide and chloroacetonitrile.

4. Process according to claim 1 wherein the ratio of the number of moles of total polyethenoxy halide to the number of moles of substituted polyamine lies within the range 1:5 to 5:1.

5. Process according to claim 1 wherein the reaction product is applied to the textile material from an aqueous solution.

6. The product obtained by reacting a member selected from the group consisting of N-(carboxyalkyl)-, N-(amino-carbonylalkyl)-, N-(cyanoalkyl)- and N-carbalkoxyalkyl substituted polyamines with a halide of an ethylene oxide condensate, said reaction being carried out in a solvent for the reactants and at a temperature between room temperature and the boiling point of the solvent.

7. The product according to claim 6 wherein the ratio of moles of halide to moles of substituted polyamine is between 1:5 and 5:1.

References Cited in the file of this patent

UNITED STATES PATENTS 2,596,985    Cook et al. _____ May 20, 1952